Feb. 9, 1954 W. P. VON BEHREN 2,668,898
ELECTRIC FOOD BROILER
Filed Dec. 9, 1949 3 Sheets-Sheet 1
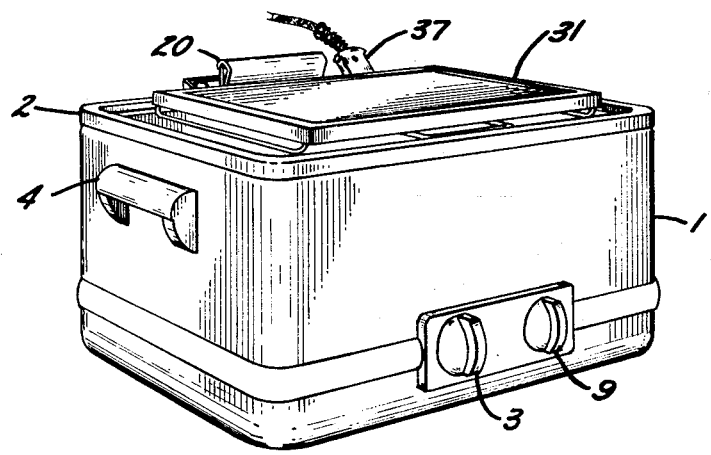
Fig. I
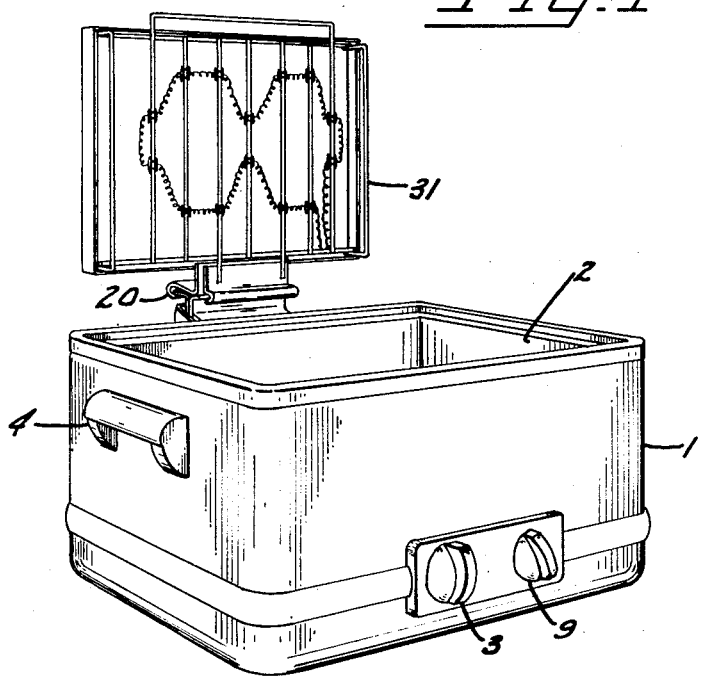
Fig. II
INVENTOR.
William P. Von Behren
BY
Marshall, Marshall & Leonard
ATTORNEYS Feb. 9, 1954 W. P. VON BEHREN 2,668,898
ELECTRIC FOOD BROILER
Filed Dec. 9, 1949 3 Sheets-Sheet 2
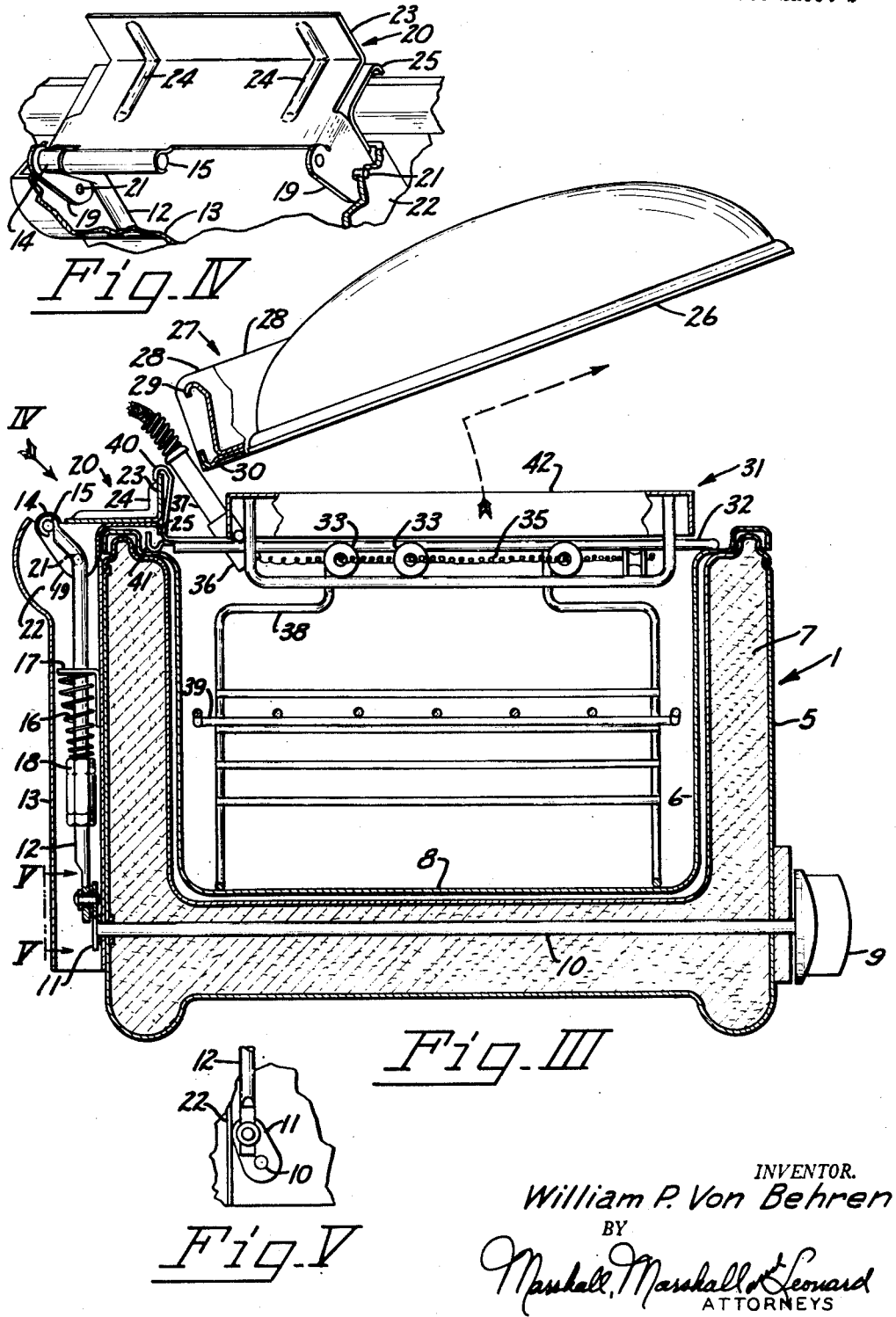
INVENTOR.
William P. Von Behren

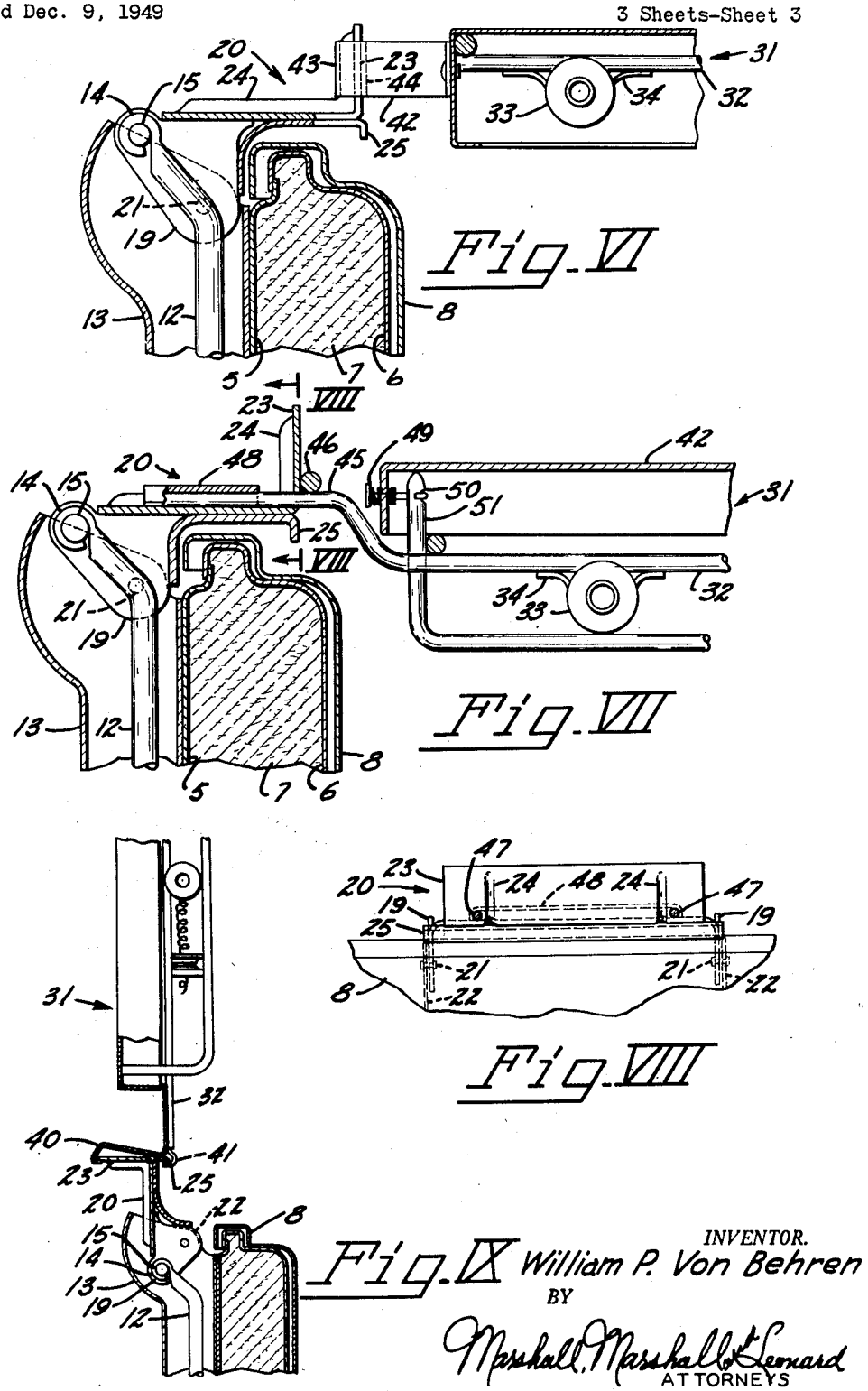

Patented Feb. 9, 1954

2,668,898

UNITED STATES PATENT OFFICE 2,668,898

ELECTRIC FOOD BROILER

William P. Von Behren, Toledo, Ohio, assignor, by mesne assignments, to Tropic-Aire, Inc., Chicago, Ill., a corporation Application December 9, 1949, Serial No. 132,131

6 Claims. (Cl. 219—35)

This invention relates to electric food broilers and, more particularly, to an electric food broiler of the type designed to function as an accessory or auxiliary device in connection with a domestic type electric food roaster.

A domestic food roaster of the type currently being sold consists in an open topped insulated food receptacle which is inserted in a body also containing heating elements, temperature control rheostats, etc. Food to be roasted in such a device is placed within the food receptacle which is then covered and the food is roasted by the heat built up by the heating elements and retained therein by the insulating material. Because the device is equipped with a food receptacle and with a food rack or grill for supporting the food to be cooked, it is often desirable to use a broiling attachment with the roaster in order to broil food placed on the rack.

A broiler attachment for an open topped food roaster usually consists in a laterally extending heating coil with a heat reflector above the coil so that the heat generated by the coil is reflected downwardly into the body of the roaster to broil a steak or other food which is placed in the receptacle and usually supported on the food rack or grill. Because the housewife desires to examine the food during the boiling process, a food broiler must be easily movable away from its position overlying the food receptacle and obstructing access thereto. Because of the intense heat generated by the coils, a broiler cannot be merely lifted off the roaster body and placed somewhere else and, therefore, such a broiler almost always is hingedly supported in position over the body of the roaster, being swingable from the broiling position overlying the receptacle to an upright position extending generally vertically at one side of the roaster body.

Prior art roaster broiler attachments have been of two general types. In one of these types the broiler is hingedly supported by means of a clamp or fraction clip which is engaged over one wall of the roaster body itself and provides a hinge on which the broiler can be swung upwardly into unobstructing position. This construction is less than desirable because the clamp or other support means may very well mar or even chip the finish on the roaster body. Another type of broiler is hingedly mounted upon the food rack itself. This form of mounting also is less than desirable because when the broiler is swung upwardly into unobstructing position it is very likely to overbalance the comparatively light wire grill or rack and the entire apparatus may fall out of the roaster or may spill the food resting on the rack and possibly burn the housewife or the surface of a table or other object on which the roaster rests.

A further difficulty with either of these types of broiler attachments is that when swinging such a broiler from its broiling position to its inoperative position, it is necessary for the housewife to take hold of the attachment at some place and to swing it upwardly, moving her hand and arm above the food being broiled which may be heated to an extent such that grease droplets may be sputtering and may burn her hand or arm.

It is the principal object of this invention to provide an electric broiler attachment for a domestic type food roaster which is so designed that it can be hingedly mounted above the food roaster body for movement between a broiling position overlying the food receptacle and a non-obstructing position by remote operating means which also is designed to open and close the roaster cover.

It is another object of this invention to provide a broiler attachment for a domestic type food roaster in which the entire attachment and the cover for the roaster are interchangeably mounted upon the same hinging mechanism thereby eliminating the necessity for mounting the broiler on the body of the roaster or on the food supporting rack and providing for the broiler movement the same advantages already existing for the cover movement by means of remote mechanism eliminating any danger of scalding the housewife's arm.

These and more specific objects and advantages will be apparent from the drawings in which:

Figure I is a perspective view of a domestic food roaster equipped with a broiler attachment embodying the invention and shown with the broiler in broiling position.

Figure II is a view similar to Figure I but showing the broiler in raised, non-obstructing position.

Figure III is an enlarged transverse vertical sectional view of the roaster shown in Figures I and II and illustrating both how the roaster cover is mounted interchangeably with the broiler attachment embodying the invention and how such attachment is removable from the roaster.

Figure IV is a fragmentary, enlarged, isometric view showing details of the hinge means employed in the roaster illustrated in Figure III and taken from the position indicated by the arrow marked IV.

Figure V is a fragmentary detailed view in elevation taken substantially from the position indicated by the line V—V in Figure III.

Figure VI is a fragmentary vertical sectional view on a slightly enlarged scale and showing one means for mounting a broiler attachment embodying the invention.

Figure VIII is a view similar to Figure VI but showing a modified broiler attachment mounting means.

Figure VIII is a fragmentary detailed view taken substantially on the line VIII—VIII of Figure VII.

Figure IX is a view similar to Figures VI and VII but on a smaller scale and showing the broiler attachment mounting means illustrated in Figure III but with the broiler in non-obstructing position.

A domestic type food roaster with which a broiler attachment embodying the invention is adapted to be employed may comprise, among other parts, a generally rectangular main body 1 having a removable open topped food receptacle 2 and equipped with a rheostat (not shown) under the control of a temperature control knob 3. The food roaster may have handles 4 for portability. The body 1 of the food roaster (see Figure III) consists in an outer shell 5 having a spaced inner liner 6 with the space therebetween filled with heat insulation material 7. A removable food receptacle or shell 8 has the same general shape as the liner 6 and is almost as large as the liner 6 so that very little space exists between their walls when the shell 8 is inserted in the liner 6. The roaster is equipped with a cover lifter mechanism more fully disclosed and claimed in Hammell Patent No. 2,209,693. The cover lifter mechanism is operated by a hand knob 9 located on the front of the roaster body 1 adjacent the thermostat knob 3 and secured on the front end of a rearwardly extending shaft 10 at the rear end of which there is pinned an eccentric cam 11. The cam 11 is pivotally connected to the lower end of a pull rod 12 which extends upwardly parallel to the rear wall of the roaster body 1 within a cover lifter housing 13. The rod 12 has at its upper end a hooked shaped portion 14 which is engaged over a horizontally extending pin 15 (see also Figure IV). The rod 12 extends through the center of a coiled spring 16 which acts against a bracket 17 welded or otherwise secured to the roaster body and the tension of which can be adjusted by a lock nut 18 threaded on the rod 12. The spring 16 is biased to pull the rod downwardly. The pin 15 extends between two downwardly extending parallel ears 19 formed at the ends of a hinge member 20 (Figure IV). The hinge member 20 is pivotally mounted by a pair of mounting pins 21 in parallel end walls 22 of the cover lifter housing 13. The hinge member 20 has an upwardly turned flange 23 strengthened by embossings 24 and a downwardly turned shorter flange 25 may be welded thereto.

Thus when the hand knob 9 is rotated the cam 11 is turned overcenter from the locked position shown in Figure V by being rotated in a clockwise direction (Figure V) and the expansion of the spring 16 existed by force of the hand knob 9 pulls the rod 12 downwardly asserting downward pressure on the pin 15 and pivoting the hinge member 20 on its pins 21 in a counterclockwise direction (Figure III). The structure is so designed that upon complete expansion of the spring 16 and movement of the rod 12 to its lowermost position, the hinge member 20 is swung up and back through approximately 90 degrees of movement. When the cover is to be closed, the knob is rotated in the opposite direction until the cam 11 passes over center and stops against the wall 22 as shown in Figure V.

The food roaster is equipped with a removable cover 26 (see Figure III) which has a mounting bracket 27 at its rear. The bracket 27 consists in a pair of vertically extending connected walls 28 and two transversely extending hook-like latch members 29 and 30. The latch 29 engages over the upper edge of the flange 23 on the hinge member 20 and the latch 30 engages beneath the downwardly turned edge of the flange 25 of the hinge member 20. By moving the roaster cover 26 bodily in the direction shown by the large broken arrow in Figure III, it can be disengaged from the hinge member 20 and removed from the roaster body for washing or to enable a broiler attachment embodying the invention to be mounted on the hinge member 20 as will now be described.

A broiler attachment 31 embodying the invention consists in a frame 32 constructed from a plurality of wires which are welded or otherwise secured together to form a grill work. Ring shaped insulators 33 are secured to the wires forming the frame 32 by means of small clips 34 (see Figure VI) and support a heating element 35 which extends almost throughout the area of the frame 32. The heating element 35 is electrically connected to a unit plug 36 which receives an appliance cord or plug 37 for electrically energizing the element 35. When the broiler attachment 31 is in broiling position (as is shown in Figure III) the element 35 horizontally overlies a food rack 38 which is provided with a horizontal-like grill shelf 39 and which is located in the interior of the food receptacle 8 for supporting the food being broiled.

The broiler 31 is supported in broiling position overlying the food receptacle 8 and the food supported by the shelf 39 by means of the front end of the frame 32 and latch members 40 and 41 which are welded or otherwise secured to the rear of the wire frame 32 and engaged with the flanges 23 and 25 of the hinge member 20. The broiler 31 may be equipped with an inverted pan-like reflector 42 which is supported on upwardly turned wires forming part of the frame 32 and overlies the element 35 to reflect heat downwardly into the body of the roaster. The reflector 42 also is heated by the element 35 and may be used as a griddle when it is desired to fry food.

When a housewife desires to examine the food being broiled, she rotates the knob 9 which, through the linkage already described, swings the hinge member 20 in a counterclockwise direction. The expansion force of the spring 16 plus the rotating force on the knob 9 is sufficient to swing the broiler 31 upwardly with the hinge member 20 into the position shown in Figures II and IX, providing access to the food being broiled. When desired, the broiler 31 is lowered into broiling position by rotating the knob 9 in the opposite direction, the weight of the broiler 31 plus the knob 9 serving to compress the spring 16 storing energy to lift the broiler at a subsequent time. When the broiling operation is finished and it is desired to remove the broiler attachment 31 from the roaster, it is placed in broiling position and then swung upwardly and moved forwardly, as shown by the large broken arrow in Figure III, disengaging the latch members 40 and 41 from the flanges 23 and 25 of the hinge member 20. The cover 26 can then be re-engaged on the hinge member 20 and the roaster is in condition for roasting.

A broiler attachment 31 embodying the invention is adapted for use by a housewife without danger of scalding or otherwise burning her arm and can be swung from broiling to non-obstructing positions without the necessity for handling the hot broiler itself and, since it is interchangeable with the cover for the roaster, no special means need be provided for hinging the broiler attachment on the roaster body or on the lightweight, relatively flimsy wire food rack 38.

Figure VI shows a modification of the broiler attachment mounting means which consists in a rearwardly extending frame 42 having two spaced cross members 43 and 44 which are slipped downwardly over the upturned flange 23 of the hinge member 20. When it is desired to remove the broiler 31 equipped with this type of frame 42, the broiling attachment is put in broiling position as illustrated in Figure VI and then is lifted vertically.

Figures VII and VIII illustrate yet another form of broiler attachment mounting means. In this embodiment the frame 32 of the broiler 31 has two extended frame members 45 which project rearwardly from the frame 32 and are tied together by a cross wire 46. The members 45 are inserted in two holes 47 in the flange 23 of the hinge member 20 beneath a horizontal cross member 48 which is welded or otherwise secured to the horizontal main portion of the hinge member 20. In this embodiment of the invention the reflector 42 is shown as being equipped with a pair of spring pressed latches 49 which are engageable in notches 50 cut in the uppermost ends of upright frame elements 51 for retaining the reflector and griddle 42 on the broiler 31. When it is desired to remove the broiler 31 with this form of attaching means, the broiler is swung into the upper position, or at least swung upwardly slightly from the broiling position shown in Figures VII and VIII, and the broiler 31 is bodily moved along the line of its two rearwardly extending members 45 sliding these members out of the holes 47.

Figure IX illustrates the embodiment of the invention shown in Figure III in the upper or non-obstructing position to show how the broiler 31 is retained by the latches 40 and 41 on the flanges 23 and 25 of the hinge member 20.

The various embodiments of broiler attachment engaging and mounting means have been disclosed herein as illustrative of the many forms of structure by which a broiler attachment embodying the invention can be removably mounted upon a roaster cover lifter mechanism interchangeably with a roaster cover and by means of which the concept embodying the invention and set forth in the claims below can be achieved; the particular forms of bracket or cooperating means shown on the broiler attachment and hinge member not being essential to the invention.

Having described the invention, I claim:

1. In combination in a combination roaster and broiler, an open-topped container constituting a roaster body, two interchangeable overlying parts for said receptacle consisting of a roaster cover and a broiler frame having an electric broiling heater thereon, a hinged supporting bracket for said overlying parts hinged to said food receptacle on a horizontal pivot line at the rear of said receptacle near the top thereof and rotatable through an angle of approximately 90 degrees, cooperable detachable connectors on said hinged bracket, said roaster cover and said broiler frame for supporting said cover and broiler frame on said bracket separately so that rotation of said bracket carries said cover or rack from a substantially horizontal position overlying said receptacle to an approximate vertical position for giving access to said receptacle, an exterior operating handle on said food receptacle remote from said hinged supporting bracket, actuating mechanism connecting said handle to said bracket for rotating it and for lifting and lowering said cover and broiler rack, said cooperable detachable connectors including two hooks on said hinge bracket turned away from each other and lying one above the other when said bracket is in the position for holding said roaster cover or broiler frame in said overlying position, said connectors including also a pair of hooks on each of said broiler frames and roaster covers, said hooks of said pair opening toward each other for engaging the hooks of said hinge, said roaster cover or broiler frame, when in said overlying position, being supported on the upper hook, and when in said vertical position, sliding on said upper hook for engaging the lower hooks.

2. A coupling for a hinge and rider wherein the hinge swings about a horizontal axis for carrying a rider with its center of gravity remote from said axis and for swinging it from a position above to at least one side of the axis, the hinge having two coupling hooks which in the position of the hinge for supporting the rider at said one side of said axis, lie generally one clockwise from the other, said hooks having their bits turned away from each other, the rider having two hooks with their bits turned toward each other for engaging the hooks of said hinge, the shallower of the two hooks lying at the clockwise side being shallower than the shallower of the two hooks on the counter-clockwise side, the distance between the bits of the hooks on said rider being less than the distance between the bits of the hooks on said hinge, but greater than said distance minus the depth of the shallower of said two hooks on the clockwise side, and cam means for moving said rider counter-clockwise on said hinge in response to a movement thereof toward said axis.

3. The combination of claim 2 wherein said cam means includes a cam surface inclined to a line from it to the center of gravity of said rider.

4. The combination of claim 3 wherein said cam surface is on said rider and engages the bit of the counter-clockwise hook on said hinge.

5. For attachment to a hinge member swingable about a horizontal axis and having two supporting edges turned away from each other over which catches may be hooked, a rider having two hook-like catches opening toward each other, with the points of the hooks spaced apart less than the distance between said supporting edges of the hinge, the distance from the point of one hook to the bight of the other being greater than the distance between said supporting edges.

6. The device of claim 5 wherein the shank of said other hook has an inclined surface arranged to engage one of said supporting edges of the hinge when said rider is urged toward said hinge, for thereby sliding said first hook into engagement with the other supporting edge.

WILLIAM P. VON BEHREN.

References Cited in the file of this patent
UNITED STATES PATENTS

| Number | Name | Date |
|---|---|---|
| 2,110,559 | Smith | Mar. 8, 1938 |
| 2,188,757 | Moon | Jan. 30, 1940 |
| 2,209,693 | Hammell | July 30, 1940 |
| 2,242,328 | Russell et al. | May 20, 1941 |
| 2,266,099 | Uhlrig et al. | Dec. 16, 1941 |
| 2,266,101 | Uhlrig et al. | Dec. 16, 1941 |